Patented Sept. 26, 1933

1,927,883

UNITED STATES PATENT OFFICE 1,927,883

PROCESS FOR TREATING LIQUORS TO REMOVE ORGANIC COMPOUNDS THEREFROM

William B. Wingert, Ironton, Ohio, assignor to Semet-Solvay Company, New York, N. Y., a corporation of New York No Drawing. Application December 21, 1929
Serial No. 415,831

12 Claims. (Cl. 260—154)

This invention relates to the treatment of liquids to recover phenols therefrom and particularly to the removal of impurities from the phenols or liquors in which the phenols are present with consequent improvement in the quality of the phenol product.

The invention is particularly applicable to methods of extracting phenols from liquors such as that described in the co-pending application of Herbert B. Cobb, Serial No. 249,609, although the invention is not limited to its use with the process described in that application.

In the process as described in the application referred to above, weak ammoniacal liquors containing phenols are treated with an organic solvent, such as light oil resulting from the distillation of coal for the recovery of the phenol content of the liquor. The solvent dissolves the phenols from the weak liquors and being immiscible with water is then readily separated therefrom. The solvent is then treated with caustic alkali solution which converts the phenols into water-soluble phenolates which dissolve in the caustic solution and from which the phenols may be recovered by acidifying to liberate the phenols as such.

I have found in carrying out such a process that the presence of impurities such as hydrogen sulfide, carbon dioxide, or other impurities which are present in the liquor or carried by the solvent, greatly increase the amount of alkali consumed in effecting the extraction of the phenols from the solvent. The hydrogen sulfide, carbon dioxide and other impurities react with the alkali forming alkali metal salts, thereby consuming substantial quantities of the relatively expensive caustic and further resulting in contamination of the phenol or sodium phenolate product with such impurities.

The principal objects of the present invention are to overcome the above disadvantages, to produce a purer quality of phenol and to effect substantial savings in the quantity of alkali required for extraction of phenols from solvents.

A further object of the invention is to provide an improved method for the removal of phenols from liquors containing the same.

These and other objects and features of the invention will appear from the following description of a preferred embodiment of the invention as employed in conjunction with the process of extracting phenols from liquors described in the above mentioned application of Herbert B. Cobb.

This invention is particularly applicable to the standard or usual by-product coke oven plant or installation wherein hydrocarbon oil solvents, i. e., light oil, heavy oil, etc. are by-products obtained from the gas distillate in the normal operation of the plant. In such plants the waste liquors to be treated for recovery of phenol, e. g. the so-called weak liquors containing small amounts of tar acids, ammonia and other constituents produced in the operation of the plant are passed through scrubbing towers in co-current flow or in counter-current relation with a suitable organic solvent or extracting medium such as light oil, in which treatment the medium extracts or absorbs the phenols or tar acids from the waste liquors. Such light oil may be the unrefined oil obtained at the coke oven plant by treating the gas distillate with a suitable absorbing medium such as straw oil and thereafter distilling the resultant benzolized oil to obtain the crude light oil containing benzol, toluol, xylene, a small fraction of unsaturated compounds, i. e. olefines, and other constituents.

The phenolated solvent oil will ordinarily contain certain impurities absorbed from the liquor which are capable of combining with alkali to produce undesirable salts, thus consuming a considerably greater quantity of alkali than is required merely for reaction with the phenol. These impurities may be hydrogen sulfide, carbon dioxide or other substances which are more or less soluble in water. I have found that these impurities may be removed from the solvent without substantial loss of phenol by washing the solvent prior to the caustic treatment, or other treatment to recover the phenols from the solvents. In washing the solvent I prefer to use water since water is immiscible with the solvent so that it is readily separated therefrom and is available at all plants in suitable quantities. The effectiveness of this washing operation may possibly be explained on the basis that the solubility of phenols in organic hydrocarbon solvents appear to be much greater than in water, while the reverse appears to be true for the major impurities such as hydrogen sulfide, carbon dioxide, etc. present in the phenol-solvent mixture.

The washing of the phenolated oil may be effected in any suitable manner or in any desired apparatus. Preferably the phenolated light oil or other solvent is introduced into the bottom of a vessel and washing water is sprayed onto the phenolated solvent in finely divided form or drops which pass downwardly through the solvent absorbing and dissolving hydrogen sulfide and other impurities. The water collects in the bottom of the vessel and is removed. The solvent passes upwardly through and about the water introduced from above and passes out near the top of the vessel. The water and solvent thus pass through the vessel counter-current to each other. However, parallel flow of the water and phenolated solvent may be employed with almost the same effectiveness. Any water carried out with the solvent passing from the vessel may be allowed to settle out by passing the solvent in a slow stream through a settling tank or by allowing the solvent and water to stand until separated. The temperature of the washing water may vary considerably, the temperatures from 35° F. to 80° F. being usual in ordinary practice.

The washed and purified light oil or solvent containing the phenols dissolved therein may then be treated with caustic to form sodium phenolates or carbolates and simultaneously purify the light oil so that the phenols are removed therefrom. After repeated use, the light oil may be withdrawn and refined or otherwise treated to prepare commercial products such as benzol, toluol, etc.

Inasmuch as the usual by-product coke oven plant is not equipped with apparatus for the treatment of the carbolate solution, the carbolate solution is preferably concentrated so as to render its transportation commercially practical and thereafter shipped to a consumer or manufacturer where it may be neutralized with acid such as sulfuric acid, or treated with carbon dioxide or niter cake to form phenols which may then be recovered as such.

As specific examples of the invention, 112,950 gallons of phenolated light oil containing .0323 grams of $H_2S$ per liter were washed in the manner described above with 10,254 gallons of water at an average temperature of 59° F. The phenolated oil leaving the washing apparatus contained only .0102 grams of $H_2S$ per liter. This indicates a removal of 68.4% of the total $H_2S$ present in the phenolated oil treated.

In the example cited, the washed phenolated light oil is treated with 327.6 lbs. of NaOH to effect removal of the phenol from the solvent. This amount of caustic represents 305 lbs. of NaOH which combines with the phenols to convert them to water soluble bodies and 22.6 lbs. of NaOH which combines with the remaining $H_2S$ and other impurities in the light oil.

If the washing operation had not been employed the extraction of the phenols from the solvent would have required 376.7 lbs. of NaOH; of which 71.7 lbs. would be removed from the reaction by $H_2S$ and other impurities whereas the amount of 305 lbs. required to combine with the phenols would remain the same.

The step of washing the phenolated light oil thus effects a saving of 49.1 lbs. of caustic or 13% of the amount of caustic which would be required if the phenolated oil had not been given the washing treatment.

In another instance 93,545 gallons of phenolated oil containing .0255 grams of $H_2S$ per liter were washed with 9,996 gallons of water at 64° F. in the manner described. The phenolated oil after washing contained only .0119 grams of $H_2S$ per liter. In this case the washing operation effected the removal of 53.3% of the $H_2S$ in the oil treated. The amount of NaOH required for effecting removal of the phenols was thus reduced from 299.9 lbs. to 274.9 lbs. so that the process effects a saving of 25 lbs. of NaOH which represents 8.3% of the caustic which would have been required if washing of the solvent had not been employed.

It will be seen from the above examples that the step of washing the phenolated light oil or solvent reduces the cost of carrying out the process in that the amount of hydrogen sulfide removed is in excess of 50% of that present in the solvent prior to the washing operation and the loss of sodium hydroxide in the cycle is reduced due to the washing out of $H_2S$ and other impurities from 71.7 lbs. to 22.6 lbs. in the first example and from 46.9 lbs. to 21.9 lbs. in the second example. Furthermore, the product obtained from the phenolated solvent which has been washed is superior to that obtained by the extraction of phenolated solvents which have not been so treated.

While the invention has been described in its preferred form it should be clearly understood that other solvents than light oil may be employed for recovering phenols from the liquors. It will also be apparent that my invention may be employed for recovering organic substances other than phenols from liquors by the process herein described.

I claim:

1. In the process of recovering phenols from liquors containing the same by the action of a solvent, the steps comprising removing from the solvent impurities such as hydrogen sulphide which are present in the solvent and thereafter treating the solvent with an alkaline reagent to remove the phenols from the solvent.

2. The method of treating liquors containing phenols which comprises separating the phenols from the liquor by an organic solvent which is immiscible with the liquor, removing water soluble impurities from the solvent and thereafter treating the solvent to recover the phenols therefrom.

3. The method of treating liquors containing phenols which comprises separating the phenols from the liquor by an organic solvent which is immiscible with the liquor, removing water soluble impurities from the solvent and thereafter treating the solvent with an alkaline reagent to recover the phenols therefrom.

4. The method of treating liquors containing phenols which comprises separating the phenols from the liquor by an organic solvent which is immiscible with the liquor, washing the solvent with water to remove from the solvent impurities such as hydrogen sulphide which are present in the solvent and treating the solvent to recover the phenols therefrom.

5. The method of treating liquors containing phenols which comprises separating the phenols from the liquor by an organic solvent which is immiscible with the liquor, dissolving out from the solvent impurities such as hydrogen sulphide which are present in the solvent and treating the solvent to recover the phenols therefrom.

6. In the process of recovering phenols from liquors containing the same by the action of a water immiscible solvent, that improvement which comprises introducing the phenolated solvent into a vessel, introducing water into the vessel above the solvent and allowing the solvent to pass upwardly through the water whereby impurities such as hydrogen sulphide which are present in the solvent are dissolved out of the solvent.

7. The method of treating liquors containing phenols which comprises separating the phenols from the liquor by an organic solvent which is immiscible with the liquor and which is immiscible with water, introducing the phenolated solvent into a vessel, introducing water into the vessel above the solvent, allowing the solvent to pass upwardly through the water whereby the impurities such as hydrogen sulphide which are contained in the solvent are removed by the water, separating the solvent from the water and recovering the phenols from the solvent.

8. The process of recovering phenols from liquors containing the same comprising treating the liquors with a solvent for the phenols which is immiscible with water, separating the solvent from the liquor, passing water in finely divided form through the solvent to remove from said solvent impurities such as hydrogen sulphide which are present in said solvent, separating the solvent from the water and recovering the phenols from the solvent.

9. In the process of recovering phenols from liquors containing the same by the action of a solvent which is immiscible with water, the step which comprises passing the solvent and water counter-current to each other to effect the removal of impurities such as hydrogen sulphide which are present in said solvent prior to the recovery of phenols therefrom.

10. In the process of recovering phenols from liquors containing the same by the action of a solvent, the step which comprises removing from the solvent impurities present therein which react with alkali to produce substances other than alkali phenolates, and thereafter treating the solvent with an alkaline reagent to remove phenols from the solvent.

11. In the process of recovering phenols from liquors containing the same by the action of a water immiscible solvent for the phenols, the step which comprises removing impurities such as hydrogen sulfide which are present in the solvent by treatment with water, whereby the impurities are dissolved in the water, prior to recovery of the phenols from said solvent.

12. The method of recovering phenols from liquors containing the same which comprises treating the liquor with an organic solvent which is immiscible with the liquor, passing water into contact with the solvent and thereafter treating the solvent to recover the phenols therefrom.

WILLIAM B. WINGERT.